United States Patent
White et al.

(10) Patent No.: US 10,275,722 B2
(45) Date of Patent: Apr. 30, 2019

(54) SELF RECOGNITION CNC MACHINING

(71) Applicants: David Ross White, Tulsa, OK (US); Jason Adam Dickey, Porter, OK (US)

(72) Inventors: David Ross White, Tulsa, OK (US); Jason Adam Dickey, Porter, OK (US)

(73) Assignee: The NORDAM Group, INC., Tulsa, OK (US)

( * ) Notice: Subject to any disclaimer, the term of this patent is extended or adjusted under 35 U.S.C. 154(b) by 0 days.

(21) Appl. No.: 15/631,412

(22) Filed: Jun. 23, 2017

(65) Prior Publication Data

US 2018/0308014 A1 Oct. 25, 2018

Related U.S. Application Data

(60) Provisional application No. 62/487,259, filed on Apr. 19, 2017.

(51) Int. Cl.
| | |
|---|---|
| *G05B 19/4093* | (2006.01) |
| *G06N 99/00* | (2019.01) |
| *G01B 11/00* | (2006.01) |
| *G05B 19/408* | (2006.01) |
| *G01B 11/24* | (2006.01) |

(52) U.S. Cl.
CPC ......... *G06N 99/007* (2013.01); *G01B 11/002* (2013.01); *G01B 11/24* (2013.01); *G05B 19/4083* (2013.01); *G05B 19/40931* (2013.01); *G05B 19/40937* (2013.01); *G01B 2210/52* (2013.01)

(58) Field of Classification Search
CPC .. G01B 11/002; G01B 11/24; G01B 2210/52; G05B 19/4083; G05B 19/40931; G05B 19/40937; G06N 99/007
See application file for complete search history.

(56) References Cited

U.S. PATENT DOCUMENTS

| | | |
|---|---|---|
| 4,466,069 A | 8/1984 | Balfanz |
| 4,677,886 A | 7/1987 | Neu |
| 4,689,920 A | 9/1987 | Geise |
| 4,907,920 A | 3/1990 | Lund et al. |
| 4,908,951 A | 5/1990 | Gurny |
| 5,543,198 A | 8/1996 | Wilson |
| 6,435,784 B2 | 8/2002 | De Mattia et al. |
| 6,856,843 B1 * | 2/2005 | Herman, Jr. ............ B26D 5/00 700/134 |
| 2007/0251641 A1 * | 11/2007 | Santos Gomez ..... B29C 70/388 156/285 |

(Continued)

OTHER PUBLICATIONS

Plascore,INC., "PN2 Aerospace Grade Aramid Fiber Honeycomb," Jun. 6, 2017, 4 pages, Plascore.Com, Zeeland, MI, USA.

(Continued)

*Primary Examiner* — Robert G Bachner
(74) *Attorney, Agent, or Firm* — Francis L. Conte

(57) ABSTRACT

A method of machining a cellular core (14) includes mounting the core (14) atop a table (12) in a multi-axis Computerized Numerical Controlled (CNC) machine (10). The machine (10) is operated to self-scan the core (14) and self-recognize individual cells (30) arranged laterally in columns and longitudinally in rows. A machining path (E) is self-generated from the pre-recognized cells (30), and the core (14) is then machined along the self-generated machining path (E).

20 Claims, 7 Drawing Sheets

(56) References Cited

U.S. PATENT DOCUMENTS

2015/0298335 A1* 10/2015 Perron .................. B26D 5/007
                                                            83/13
2016/0311062 A1    10/2016 Tiwari et al.
2017/0045877 A1*  2/2017 Shapiro .............. B23K 37/0235

OTHER PUBLICATIONS

Thermwood, "Model 43 CNC Machining Centers 3 Axis," Jul. 2015, 8 pages, Thermwood.Com, Dale, IN, USA.
Diversified Machine Systems, "3 Axis CNC Machining Centers," 2014, 2 pages, DMSCNCRouters.com, Colorado Springs, CO, USA.
Keyence, "21 Megapixel Camera," 2013, 4 pages, Keyence.Com, Elmwood Park, NJ, USA.
Nikon Metrology INC, "LC60Dx—Cost-Effective General Purpose CMM Laser Scanner," May 16, 2017, 4 pages, NikonMetrology.Com, Leuven, Belgium.
CNC Router Source, "The CNC Wood Router Basics," 2011, 4 pages, CNCRouterSource.com.
McNeel Wiki, "A Brief Explanation of CNC Machines and How They Work," Apr. 27, 2016, 3 pages, Wiki.McNeel.com.
Scott+Sargent UK, "Aggregate Heads for CNC Routers," Jun. 17, 2017, 5 pages, Scosarg.com.

* cited by examiner

SELF RECOGNITION CNC MACHINING

BACKGROUND OF THE INVENTION

The present invention relates generally to machining, and, more specifically, to Computerized Numerical Control (CNC) machining of a cellular workpiece.

Honeycomb structural panels are commonly used in the aerospace industry in fabricating aircraft due to the high strength thereof and low weight. Such panels can be formed of various materials including synthetics and metals, and typically have a honeycomb core in sheet form bounded by opposite skins adhesively bonded thereto.

In one exemplary application, an annular aircraft engine inlet is formed with small honeycomb core cells for effecting sound attenuation, with a structural outer skin, and an optional inner skin which would be perforated.

The honeycomb core is initially obtained from various manufacturers in various configurations and materials, and is typically provided in large rectangular stock sheet form, such as 2 meters by 3 meters. The core itself may be relatively flexible without its inner and outer skins, and typically includes a multitude of individual core cells due to its initially large stock configuration.

The core is typically identified by its nominal core size, such as ⅜ inch (9.525 mm), and for the 2×3 meter stock size can have about 210 by 315 cells for a correspondingly large number of total cells in a single core sheet, with the distribution of cells being generally uniform in the multiple columns and rows.

Honeycomb core sheets having exemplary hexagonal cells formed from synthetic, high strength Aramid fibers typically include continuous Aramid ribbons extending in serpentine form along the ribbon or longitudinal direction or axis, with laterally adjoining ribbons being spaced apart in the transverse direction or axis perpendicular to the ribbons and their longitudinal axis. For exemplary hexagonal cells, adjacent ribbons share common walls suitably bonded or fused together.

The length of the ribbons determines the corresponding longitudinal length of the resulting core sheet, and the number of adjoining ribbons determines the lateral width of the core sheet, which is typically larger than the length thereof.

In the exemplary aircraft engine inlet configuration, the stock honeycomb core sheets are initially purchased from a commercial vendor, and then undergo suitable fabrication processes to achieve the desired inlet configuration. One exemplary configuration requires the machining of a small notch or slot in the shared wall of adjacent hexagonal cells for the full number of small cells in the inlet configuration, which number is quite large.

Conventional processes may be used to machine such cell slots, but can experience various problems which undesirably increase the complexity, duration, and cost of machining.

One conventional process considered during development includes the use of a conventional multi-axis CNC router. The typical router includes a work table upon which the workpiece may be placed.

The router includes a gantry supporting a carriage atop the table, with suitable linear drive systems to effect compound orthogonal X-Y movement of the carriage which supports a spindle to which various router bits may be attached.

The spindle includes a third or vertical Z-axis for lowering or raising the router bit atop the mounted workpiece which is suitably machined according to its specific geometry and machining requirements.

The typical CNC router includes a programmable computer and a cooperating CNC controller. The computer provides a graphical user interface (GUI) for the operator and may be programmed in software for machining predetermined workpieces in predetermined configurations, typically in repetitive predetermined machining processes for a large quantity of identical workpieces.

The predetermined machining configuration is created during development and testing for specific workpieces, and a correspondingly specific machining program is defined for use in the CNC controller. The CNC controller is specifically configured for the particular type of CNC machine in controlling motion of the machine tool cutter along the several axes, including X,Y,Z, for example.

Conventional Numerical Control (NC) codes, such as known G-codes or ISO-codes, are used in the CNC controller to control the X,Y,Z motions of the corresponding linear drive systems, and thereby move the cutting tool linearly along each axis for collectively effecting compound X,Y,Z movement of the cutting tool as desired.

The CNC program code is therefore specific to the specific workpiece and its size and configuration, and the desired machining thereof.

Since the exemplary large honeycomb core sheet addressed above includes a multitude of small core cells specially arranged in columns and rows, it would therefore require suitable fixturing atop the router table and a suitable predetermined program code specific to its large length and width, and cell size, configuration, and relative positions.

For example, the predetermined program code could be developed to cut the desired slot in each cell with a router bit travelling along the middle of each row of 315 cells in 210 passes corresponding with the 210 columns; provided, of course, that the core sheet was precisely uniform in both the lateral and longitudinal directions, and accurately mounted atop the table.

For different sized workpieces with different sized cells with different configurations, a different program code would be required. Indeed, any change in configuration of the specific workpiece would necessarily require a different program code developed specifically therefor. And, larger size workpieces increase the likelihood of drifting of the cut in a correspondingly long machining path due to small variations in workpiece placement atop the table.

Fundamentally, the desired stock honeycomb Aramid core sheet is quite large and includes a large multitude of individual cells which would therefore require suitable mounting and alignment in a conventional cutting machine. The alignment method must be specific to the specific core type and size, and therefore can vary as workpieces vary.

Since the machine is controlled by an operator, the entire machining process can be labor intensive to ensure that mechanical alignment of the core sheet is maintained.

The core cells may shift out of position into misalignment under the forces of machining, and cause the machine to divert or drift from the intended cut path or crush the core cell walls causing irreparable damage to the core sheet, especially problematic for the large size of the stock core sheet and multitude of cells.

Conventional clamping around the perimeter of the stock sheet may lead to substantial scrap of the periphery, and further increase costs.

And, the need to suitably clamp or stabilize the stock sheet and machine the multitude of individual cells therein can result in correspondingly long machining or processing time, which further increase the cost of manufacture.

Accordingly, it is desired to provide an improved method of machining a cellular core workpiece having a multitude of individual cells subject to variations in configuration.

BRIEF DESCRIPTION OF THE INVENTION

A method of machining a cellular core includes mounting the core atop a table in a multi-axis Computerized Numerical Controlled (CNC) machine. The machine is operated to self-scan the core and self-recognize individual cells arranged laterally in columns and longitudinally in rows. A machining path is self-generated from the pre-recognized cells, and the core is then machined along the self-generated machining path.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
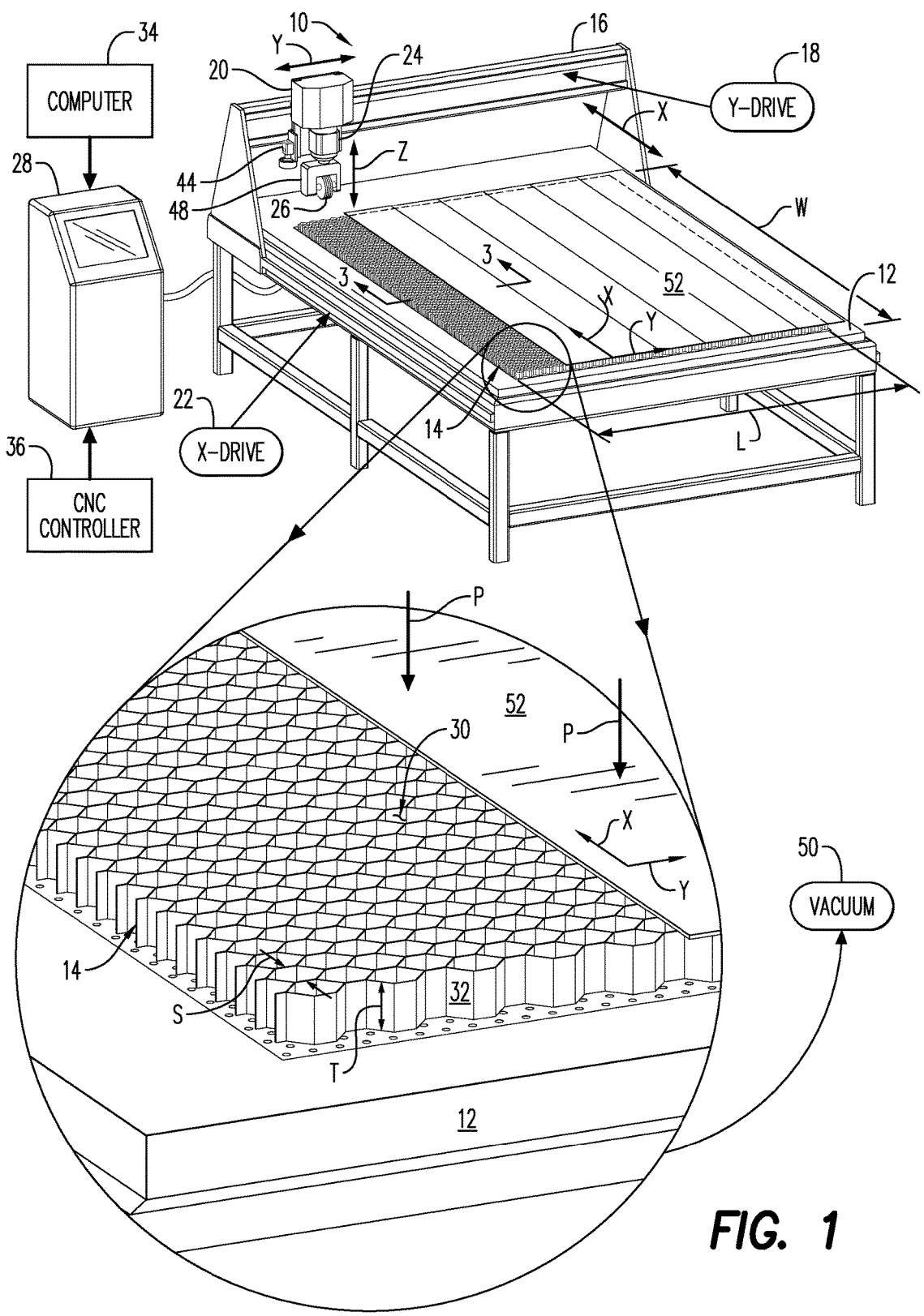
FIG. 1 is an isometric view of an exemplary CNC machine configured for machining a cellular core sheet.

Illustrated schematically in FIG. 1 is a Computerized Numerical Controlled (CNC) cutting machine 10 in the exemplary form of a multi-axis CNC router which may be conventional in configuration and operation, except as modified hereinbelow in accordance with various features of the present invention.

The machine 10 includes a flat table 12 elevated from the floor by a stand or legs, upon which table 12 is supported or mounted a workpiece 14 in the exemplary form of a cellular core in flat rectangular sheet form, referred to hereinbelow as the core sheet 14, or simply core 14.

The machine 10 further includes an elevated bridge or gantry 16 extending longitudinally across the table 12, and conventionally mounted to the table 12 by a lateral (X-axis) first drive system 22. A carriage 20 is conventionally mounted to the gantry 16 by a longitudinal (Y-axis) second drive system 18.

The carriage 20 is conventional and includes a vertical motor-driven spindle 24 to which various cutting tools may be removably attached or mounted, such as a conventional router bit (not shown). Instead of the router bit, the machine 10 is modified to include a preferential cutter 26 mounted to the spindle 24 in the carriage 20 for travel therewith.

The carriage 20 includes an internal vertical (Z-axis) third drive system for selectively vertically deploying the spindle 24 and cutter 26 for preferentially machining the core 14 atop the table 12 and along a preferential machining path.

The machine 10 further includes a control console or cabinet 28 operatively joined to the lateral drive system 22, the longitudinal drive system 18, and the carriage 20 including its vertical drive system to selectively position the cutter 26 laterally and longitudinally over the full extent of the top surface of the table 12, and correspondingly over the core 14 supported thereatop, and for lowering the cutter 26 in machining engagement with the core 14.

Power is provided to the motor-driven spindle 24 for rotating the cutter 26 and preferentially machining the core 14 as further described hereinbelow. The cellular core 14 requires preferential machining in view of its special configuration, and the otherwise conventional CNC machine 10 is therefore suitably modified as described below.

The machine 10 is an otherwise conventional multi-axis CNC machine in exemplary router form, and includes at least three axes of movement X, Y, and Z, which preferentially correspond with mounting of the rectangular configuration of the cellular core sheet 14 being machined.

Figure 2:
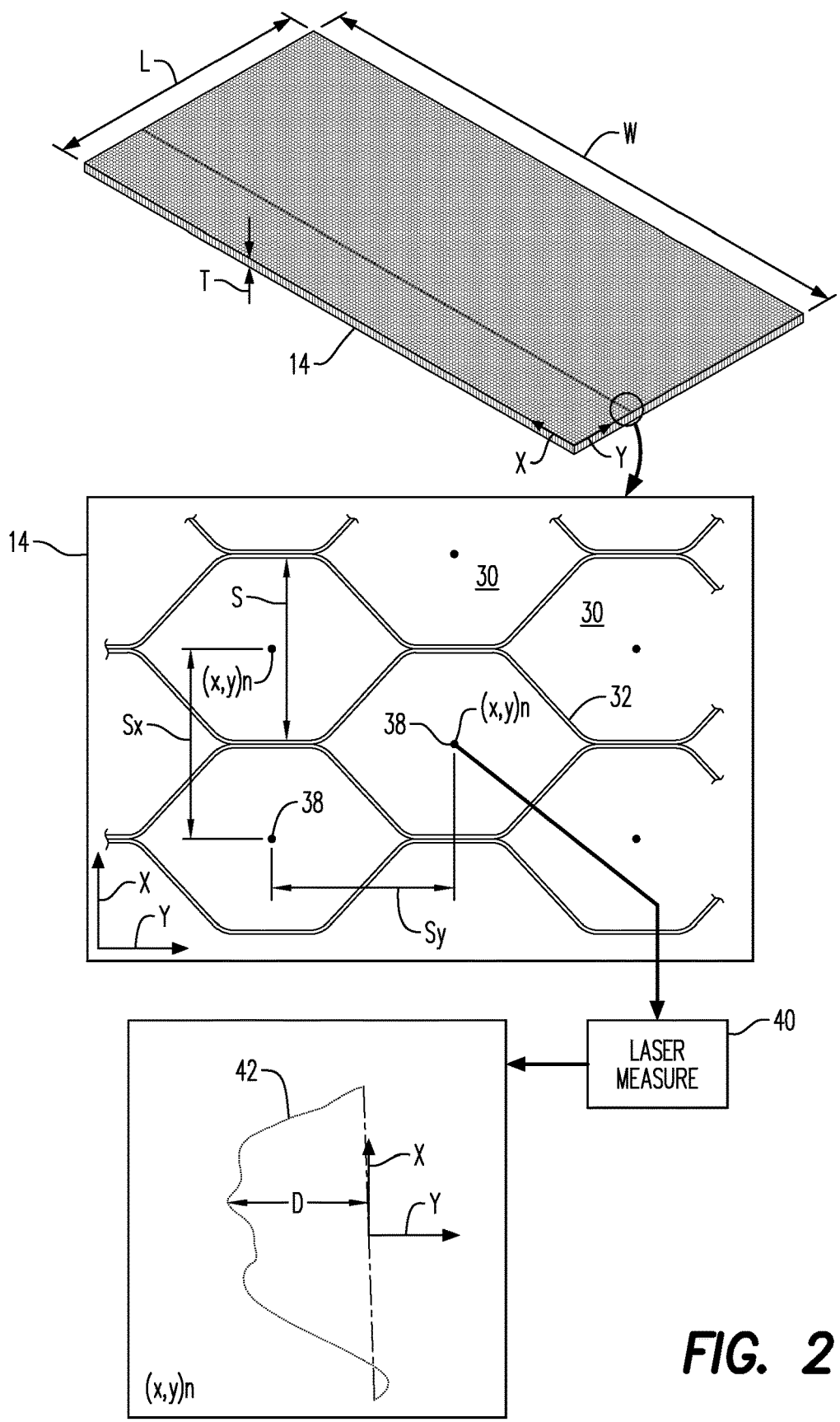
FIG. 2 is a flowchart showing measurement of the exemplary cellular core sheet of FIG. 1.

As shown in FIG. 2, the exemplary cellular core 14 is initially provided in flat, rectangular sheet form having a longitudinal length L and transverse width W, and thickness T. The core includes a multitude of individual cells 30 in the exemplary form or configuration of symmetrical honeycomb hexagons distributed generally uniformly both laterally across the width and longitudinally across the length.

In the exemplary aircraft engine inlet configuration, the honeycomb core 14 is commercially available and is made from Aramid fibers, such as Dupont Nomex (Trademark) paper coated with a heat resistant phenolic resin, configured in longitudinally extending ribbons 32 with laterally adjoining cell walls defining hexagonal cells 30. The core 14 itself has hollow cells extending over the core thickness T, about 1.5 inches (38 mm), without bounding skins bonded thereto, and is therefore relatively flexible.

The core 14 is typically identified by its nominal core size S or internal width of each cell, such as ⅜ inch (9.525 mm), and for the 2×3 (L×W) meter stock size the core 14 has a multitude of individual core cells 30 due to its initially large stock configuration. For example, dividing each of the length and width of the rectangular sheet by the nominal core size correspondingly results in about 210 by 315 cells, for a correspondingly large, multi-thousand, number of total cells 30 in the single core sheet.

The honeycomb core sheet 14 is preferentially mounted or supported atop the flat table 12 illustrated in FIG. 1 with the Aramid ribbons 32 extending longitudinally or parallel with the longitudinal Y-axis of the machine over the length L of the core 14, and the longer width W dimension of the core 14 extending laterally or parallel with the lateral X-axis of the machine 10 for preferentially machining the hexagonal cells 30 as further described hereinbelow.

The control console 28 includes a conventional programmable digital computer 34 and display monitor, along with a cooperating conventional CNC controller 36 for controlling machining of the exemplary honeycomb core 14 in a preferential process for overcoming one or more of the several problems introduced above for more quickly and more accurately cutting the honeycomb cells 30 at correspondingly reduced cost.

The CNC controller 36 is operatively joined to both the longitudinal Y-drive system 18 and the lateral X-drive system 22, as well as to the internal vertical Z-drive system in the carriage 20, for preferentially controlling travel of the cutter 26 along a preferential machining path.

Although the basic machine 10 introduced above, like any other conventional CNC router, could be used to machine the cellular core 14, various problems would develop due to the inherent configuration and flexibility of that core as purchased from a commercial vendor.

For example, FIG. 2 illustrates the exemplary cellular core 14 with Aramid paper ribbons 32 defining the multitude of hexagonal core cells 30. First note that the cells are specifically defined by the continuous ribbons 32 extending serpentine fashion in the longitudinal Y-direction.

Two laterally (X) adjacent ribbons 32 define one longitudinal (Y) row of cells 30 separated longitudinally by an intervening cell wall. A third ribbon 32 extends longitudinally in serpentine fashion to define the next laterally (X) adjacent row of cells 30, which are similarly longitudinally (Y) separated by intervening cell walls.

Since the ribbons 32 have identical thickness, the cells experience double thickness at the corresponding intervening cell walls where they are bonded or fused together to form the columns of cells extending in the lateral width direction (X).

As shown in FIG. 2, although the nominal internal size S of each cell 30 is substantially identical from cell to cell, the corresponding center-to-center, or pitch, dimensions can be different longitudinally and laterally due to this special ribbon construction.

Each cell 30 has a geometric center point 38 having orthogonal X-Y coordinates $(x,y)_n$, where n identifies each cell by number from 1 to N (about 66,000 total (9.5 mm) cells in the 2×3 meter core sheet).

The lateral center-to-center pitch spacing Sx between adjoining cells is slightly larger than the internal cell size S by one ribbon thickness due to the two adjoining thicknesses at the bonded intervening cell walls. The longitudinal center-to-center pitch spacing Sy is not increased due to the double wall thickness of the intervening walls.

FIG. 2 illustrates schematically a conventional laser scanner 40 used to accurately measure dimensions in an exemplary honeycomb core sheet commercially purchased from a vendor. In one example of nominal ⅜ inch (9.525 mm) core cells, the lateral pitch Sx measured 0.396 inches (10.058 mm) and the longitudinal pitch Sy measured 0.380 inches (9.652 mm).

This difference in lateral and longitudinal pitch increases the difficulty of suitably mounting the cellular core and defining suitable machining paths for accurately machining the individual cells 30.

It was further discovered during development testing that although the rectangular core sheet 14 was initially squared up atop the table 14 with its sides disposed substantially parallel to the orthogonal X and Y axes as defined by the corresponding motions of the gantry 16 and carriage 20, the columns of cells 30 were not linearly aligned along the X-axis.

The laser scanner 40 was used to measure the X-Y location of the geometric centers 38 of each cell 30 resulting in similar graphs each plotting the locus curve 42 of center locations along several columns of cells extending in the X-direction. The representative center curve 42 shown in FIG. 2 includes a straight reference line joining the first and opposite last measured cell centers, and the center curve 42 bows generally left in the figure, with total longitudinal (Y) variance or deviation D from the reference line shown exaggerated.

In five adjacent columns of cells 30 measured, the maximum deviation D varied from 254 mils (6.45 mm), 265 mils (6.73 mm), 274 mils (6.96 mm), 283 mils (7.19 mm), and 273 mils (6.93 mm). In all five columns the corresponding center curves 42 similarly bowed left over the middle region of each column, and collectively indicate shifting or bowing left of the entire cellular core 14.

Each column of cells 30 is clearly non-linear; and any conventional attempt to machine each column using a linear machining path along the lateral X-axis would result in undesirable differences in cut locations along the longitudinal Y-axis.

As indicated above in the Background section, although the cellular core workpiece 14 is initially purchased from a commercial vendor with a generally or nominally uniform distribution of individual cells, the actual configuration of the exemplary Aramid paper honeycomb core sheet 14 can have small variations in size and location of the multitude of cells 30 which present problems for the accurate machining thereof in the exemplary aircraft inlet application being addressed herein.

Accordingly, to improve the machining of a cellular core sheet subject to geometric variations in cell configuration, size, and position, an otherwise conventional CNC machine, like the router 10 introduced above, may be preferentially modified to self-recognize such geometric variations in the core worksheet 14 and self-regulate the machining thereof to improve uniformity of machining from cell-to-cell irrespective of linearity or non-linearity of cell alignment.

Figure 3:
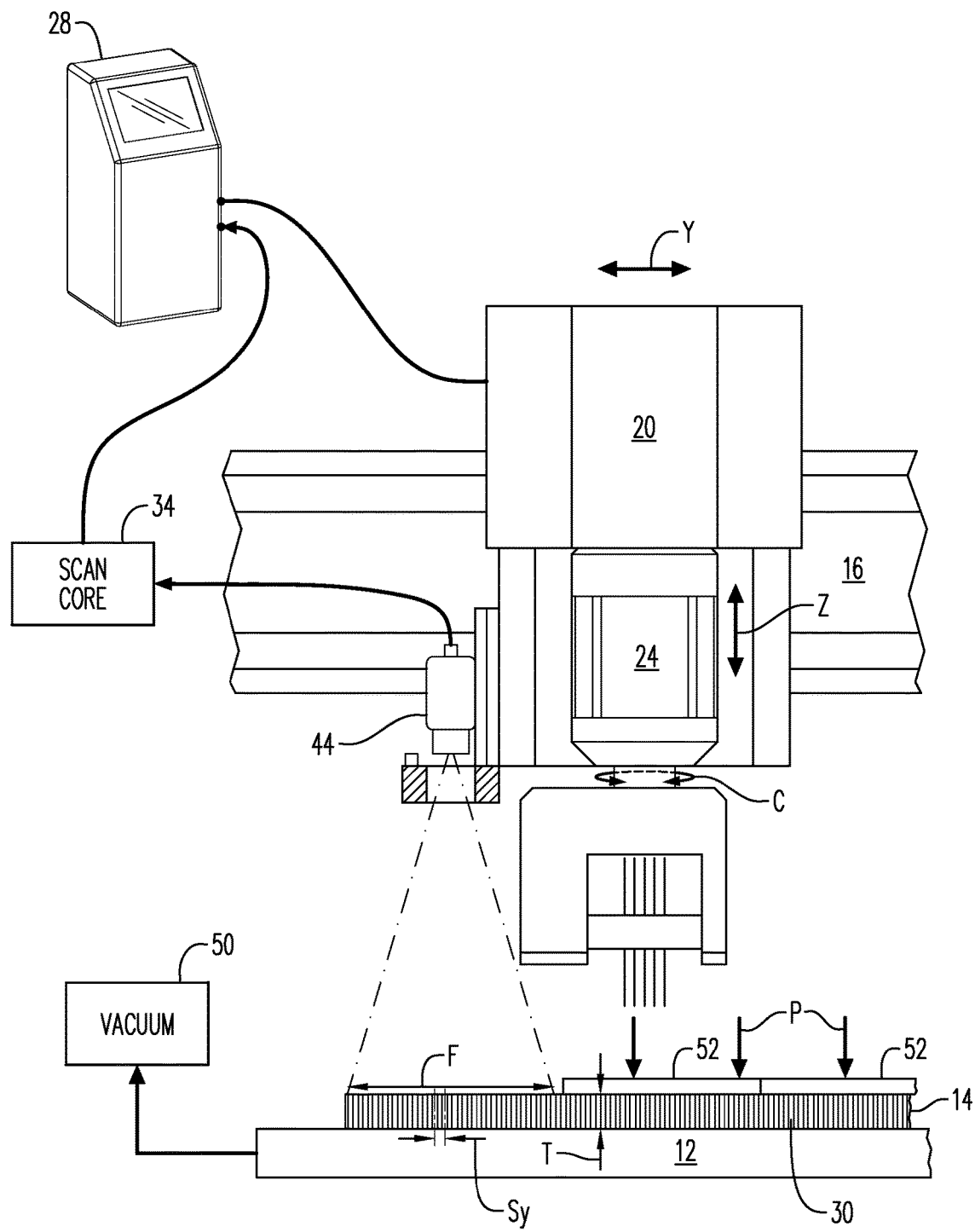
FIG. 3 is a front elevational view of the machine shown in FIG. 1 and taken along line 3-3 for scanning the core sheet.

FIG. 2 illustrates the use of the conventional laser scanner 40 to initially uncover during development testing the almost invisible non-uniformity or non-linearity of the cell distributions in the exemplary Aramid honeycomb core workpiece procured from a vendor; and accordingly the CNC machine 10 itself, as shown in FIGS. 1 and 3, is specifically modified to address these problems. For example, the machine 10 is first modified to include a suitable scanner 44 to automatically recognize the geometric features and configuration of the specific workpiece core 14 when mounted atop the supporting table 12 in the machine 10.

The scanner 44 is suitably fixedly mounted to the carriage 20 for travel therewith and is aimed downwardly for scanning the top surface of the specific core 14 mounted to the table 12, and thereby recognizing individual cells 30 thereof arranged laterally in the columns and longitudinally in the rows.

The scanner 44 may have any conventional configuration, such as various forms of commercially available measurement scanners, provided it has sufficient resolution for recognizing individual cells 30 in the core 14 for subsequent analysis and use in further in-situ programming the machine 10 for custom matching the machining path of the cutter 26 to accommodate the specific configuration and relative placement of the specific cells 30 atop the machining table 12.

For example, the scanner 44 may be an optical scanner preferably in the form of a high-resolution digital camera operatively joined to the computer 34 for optically recognizing individual cells 30. One exemplary camera scanner 44 is the 21 Megapixel Model XG-H2100 digital camera commercially available from Keyence Corporation of America, Elmwood Park, N.J. This camera includes a high-resolution CMOS image sensor with ultra high-speed capture rate of 9 FPS (110 ms) which can be incorporated into an image processing system with a relatively wide field-of-view.

Some conventional CNC routers may already have inspection or monitoring cameras operatively joined therein, which could also be modified for use herein provided they have suitable ability to recognize and identify cell geometry.

Figure 4:
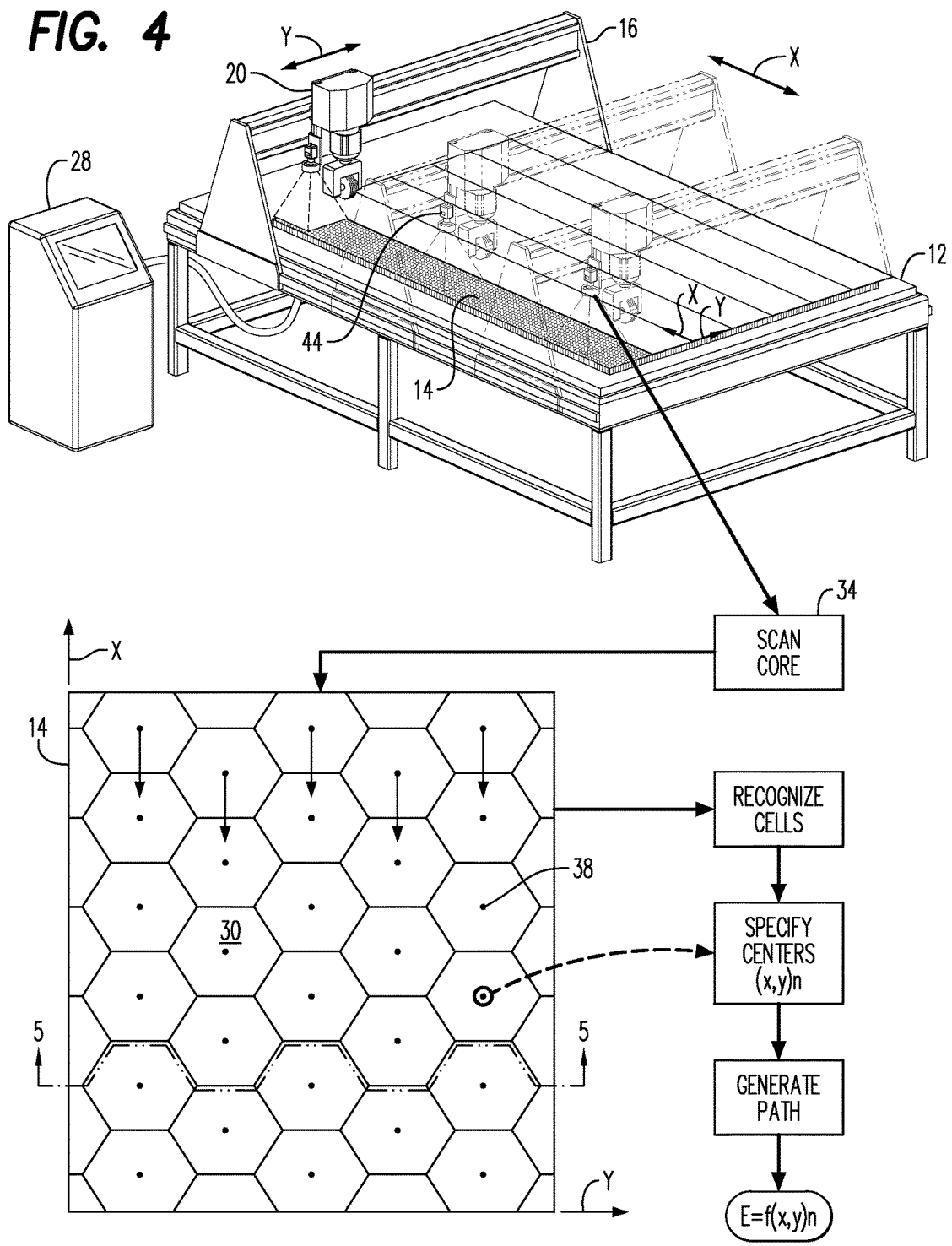
FIG. 4 is an isometric view of the machine shown in FIG. 1 in conjunction with a flowchart for scanning the core sheet to self-generate a machining path therefor.

As shown in FIGS. 3 and 4, the optical scanner 44 has a suitable field-of-view F both laterally along the X-axis and longitudinally along the Y-axis for suitably scanning a narrow target zone extending from the top to bottom ends or edges of the core 14. Scanning may be suitably configured or programmed to take a series of photo or scan segments along the target X axis which are suitably stitched together, or take a continuous photo or scan along the full target width W of the core sheet 14. In either scanning configuration, all of the cells 30 in the target zone can be optically recognized or identified.

As shown in FIGS. 2 and 3, the scanner 44 is operatively joined to the digital computer 34, which in turn is suitably configured or programmed in software to automatically scan the core 14 in situ atop the table 12, and then self-generate the desired machining path from the actual cells 30 self-recognized by the scanner 44 itself.

The computer 34 may be suitably programmed to generate any machining path desired based on the cell configuration and desired machining thereof.

For the exemplary aircraft inlet described above, the cellular core sheet 14 includes the longitudinally extending Aramid-paper ribbons with laterally adjoining cell walls defining the individual hexagonal cells 30. The hexagonal cells 30 are distributed generally uniformly both laterally and longitudinally, except for the geometric variations uncovered above.

The computer 34 and scanner 44 are therefore preferably configured to optically scan the cellular core 14 in situ to recognize or identify corresponding geometric center points 38 of the individual cells 30, as identified by the X-Y coordinates thereof relative to the orthogonal reference axes X-Y of the machine 10 itself. Each cell 30 has a corresponding geometric center point 38 having a coordinate location $(x,y)n$, where n represents the specific cell number from 1 to N, and N is the total number of cells 30 in the core 14 which are relevant to the desired machining thereof whether a the full core or a portion thereof.

Since it is desirable to utilize the entire rectangular core 14, with minimal or no waste, the total number N of cells 30 can exceed 60,000 cells of nominal ⅜ inch (9.5 mm) size as described above.

Any suitable machining path can be created, and may be based on any suitable geometric feature of the cells 30 as recognized by the scanner 44. The geometric center 38 of each cell 30 is preferred for the hexagonal core 14 since it is desired to accurately machine small notches or slots 46, see FIGS. 5 and 6, at the top of each cell 30 to bifurcate the opposite walls thereof, which correspond with the adjoining ribbon walls described above which are bonded together.

Figure 6:
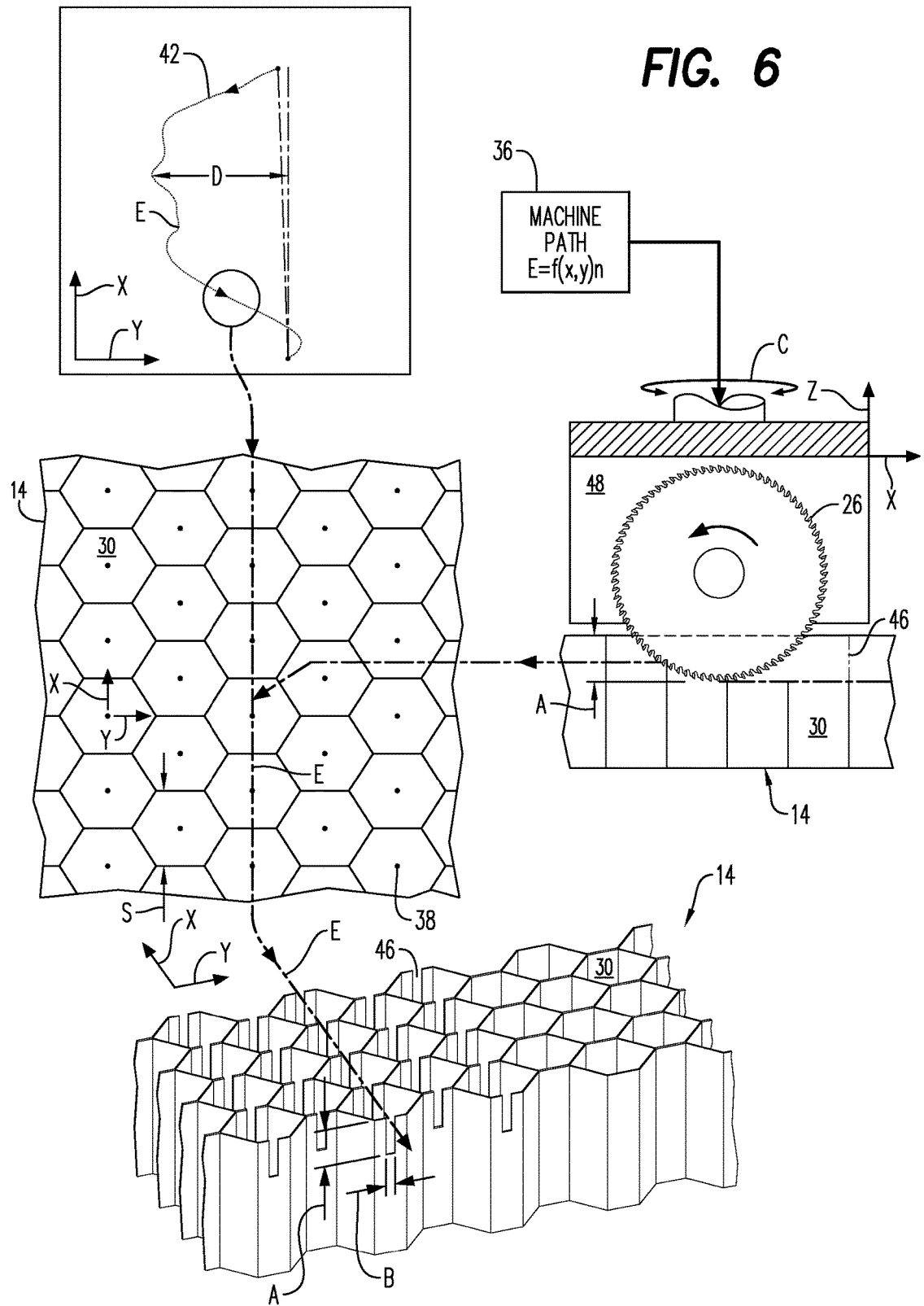
FIG. 6 is a flowchart showing machining of the core sheet shown in FIG. 5 for preferentially forming slots in individual cells thereof.

Accordingly, and as shown in FIGS. 4 and 6, a preferred machining path E may be generated laterally along the cell centers 38 in a corresponding lateral column of the cells 30. The machining path E is therefore generated as a suitable function of the locus of cell geometric centers, and may be referred to as $E=f(x,y)n$, where $n=1$ to N.

Figure 5:
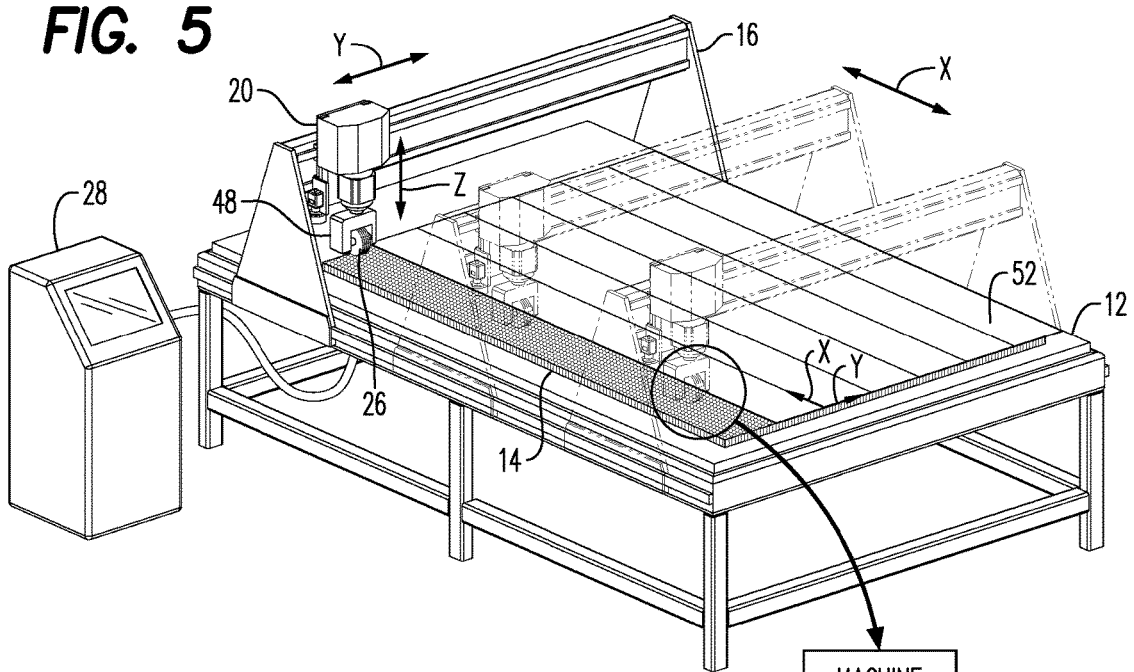
FIG. 5 is an isometric view of the machine shown in FIG. 1 being operated for machining the core sheet using the self-generated machining path shown in FIG. 4 and taken generally along cut-line 5-5.
Figure 5:
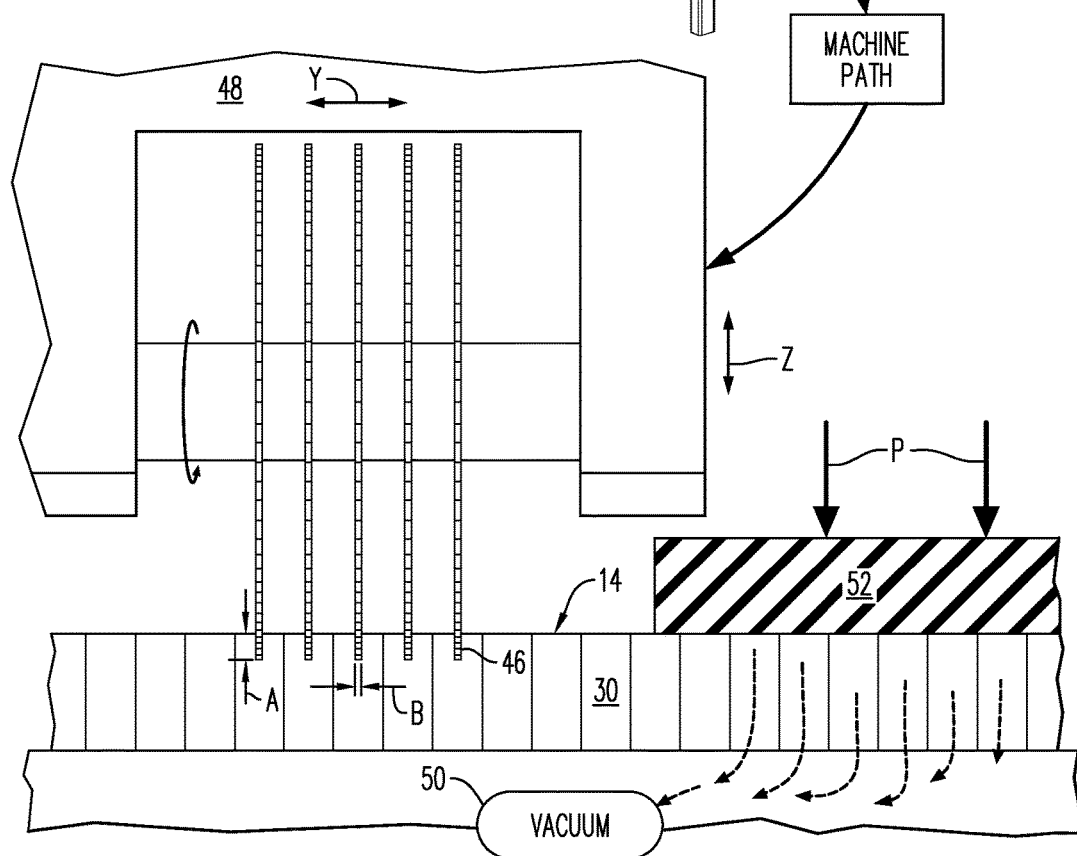

Since the exemplary hexagonal cells 30 are arranged in rows parallel to the ribbon axis, or length L direction of the core 14; and arranged in transverse columns perpendicular to the ribbon axis defining the width W of the core, an exemplary machining path E preferably extends along the cell centers in a corresponding column of cells aligned generally parallel with the lateral X-axis of the machine 10 as shown in FIGS. 5 and 6, subject to the observed non-linearity or distortion of the cell columns when the core 14 is mounted atop the table 12.

As shown in FIG. 4, the core 14 is initially mounted atop the table 12 in the multi-axis machine 10. The machine 10 is then suitably operated to move or translate the scanner 44, as supported by the carriage 20, along the lateral X-axis and along one edge of the core 14 to allow the scanner 44 to scan the core within the field-of-view F of the scanner and thereby recognize individual cells 30 as they are arranged laterally (X) in columns and longitudinally (Y) in rows.

The computer 34 is suitably configured in software for performing the scanning process over the entire core 14 in any suitable manner, and recognizing the corresponding centers 38 of the cells 30 being scanned and generating relative coordinates $(x,y)n$ therefor.

Once the actual coordinate locations $(x,y)n$ of the cell centers 38 are determined by the computer 34, the computer may then generate a suitable machining path E from the so-recognized cells 30. The machining path is preferably generated laterally along the cell centers 38 in a corresponding column of the cells 30, as mathematically represented by $E=f(x,y)n$.

Any other machining path E could also be generated as desired for the specific configuration of the cellular workpieces and desired machining thereof.

The machine 10 may then be operated to automatically machine the so-recognized core 14 along the self-generated machining path E and thereby machine corresponding cells 30 in the core 14 as desired for the specific workpiece and machining required therefor.

The so modified CNC machine 10 may therefore be configured for self-recognition in situ of the specific cellular core 14 mounted atop the table 12, and self-regulation of both the scanning and machining operation thereof.

In particular, the computer 34 is preferably configured in software to operate the scanner 44 first to scan the specific core 14 and pre-generate the desired machining path E. The computer 34 is further configured to then operate the cutter 26 second in turn through the conventional CNC controller 36 to machine the cells 30 along the self-generated machining path E.

The CNC machine 10 is therefore suitably modified or improved from its conventional configuration to self-recognize the specific configuration or geometry of the specific cellular workpiece 14 requiring machining. The workpiece 14 is suitably mounted atop the table 12, and the scanner 44 is first operated to geometrically analyze the specific configuration thereof as resting in situ atop the table 12 irrespective of any dimensional variations thereof, or any distortion or shifting of the core as supported atop the table 12.

Since the CNC machine 10 has its own reference coordinate system X,Y,Z, the configuration of the cellular core 14 may be suitably referenced thereto during the scanning process, and therefore the location of the core 14 atop the table 12, and the specific locations of the individual core cells 30, are accurately known and thereby self-referenced in the machine after scanning is complete.

No special pre-alignment or pre-fixturing of the cellular core 14 atop the table 12 is required, other than suitable placement thereof within the cutting range of the cutter 26 along the lateral X-axis and the longitudinal Y-axis.

As indicated above, the computer 34 is programmed to first operate the scanner 44 to identify and recognize the specific geometry of the cellular workpiece 14.

The computer 34 may then generate or create a suitable machining path E based on predetermined conditions programmed in software for suitably machining the intended cellular workpiece 14.

The machining path E may be as simple or complex as desired, subject to the specific type of cutter 26 being used in the machine; and is further subject to the compound motion capabilities of the specific CNC machine being used.

The desired machining path E may be initially predetermined and pre-specified in the computer 34 in generic form for effecting desired machining of specific workpiece configurations, subject to variations in size or locations of the cells therein. The exemplary machining path E guides the cutter 26 along each cell column in successive cell columns for the cellular workpiece.

As indicated above, CNC machines are quite conventional and commonly available with various multi-axis configurations and machining capabilities, subject to corresponding cost, from low to high. And, such machines may already include inspection cameras and various cutters which can be interchanged.

Pre-scanning of the actual cellular workpiece will precisely determine actual cell configurations and actual center point coordinates (x,y)n. Those scanned and identified center coordinates (x,y)n can then be simply entered into a generic predetermined machining path E definition to thereby precisely reference that generic path E to the actual, as measured, geometry of the specific workpiece atop the table 12.

The generic form of the machining path E can be substantially identical for a repetitive cellular workpiece irrespective of the number of columns and rows. For a 10×10 column-row workpiece (not shown), ten cells will be scanned and identified for each column, and the actual center coordinates (x,y)n therefor can be entered into the generic path E thusly making it specific to this workpiece, and machining thereof correspondingly precise.

For a 100×100 column-row workpiece (not shown), the scanned and identified center coordinates (x,y)n again can be used in the generic path E yet again making it specific to this workpiece for precise machining thereof.

And, for the specific honeycomb workpiece 14 having about 210×315 column-rows, yet again the scanned and identified center coordinates (x,y)n can be used in the generic machining path E making it once again specific to this workpiece for precise machining thereof.

The predetermined generic machining path E can therefore be specifically tailored to the scanned and identified cell center coordinates (x,y)n of the actual workpiece 14 when mounted in situ in the CNC machine 10 irrespective of any variations in cell geometry or location.

The CNC machine 10 includes the typical CNC controller 36 operatively joined to the lateral (X) and longitudinal (Y) drive systems 22,18 for controlling travel of the cutter 26 along the desired machining path E. The CNC controller 36 is also operatively joined to the vertical (Z) drive system which lowers and raises the spindle 24 and supported cutter 26 during operation.

Conventional CNC controllers have various configurations for controlling multi-axis movement of the cutters in corresponding machine codes. Common tool path design includes splines, Bezier, B-splines, and NURBS (Non-Uniform Rational B-splines) curves for defining and controlling tool path movement.

Accordingly, the computer 34 is initially configured to generate the desired machining path E from the cells 30 as recognized by the scanning processor; but may also be configured for converting that machining path E into suitable Numerical Control (NC) code for the particular CNC machine being used. The most common control language is G-Code or ISO-code, although any suitable control code may be used in particular brands of CNC machines.

The self-generated machining path E created by the computer 34 during the scanning operation of the cellular core 14, may therefore be suitably converted by the computer 34 itself into the suitable NC code required by the specific CNC controller 36 being used in the machine 10.

For the typical CNC machine, straight-line or linear cutting along either the X-axis or Y-axis is fundamental, with complex, non-linear motion in both the X and Y axes being common. Since the cutting tool, or router bit for example, is mounted on the conventional Z-axis, that Z-axis may be simply up or down for effecting simple planar machining in the X-Y plane. Or, the Z-axis motion of the spindle and cutting tool may be precisely controlled in a three-axis CNC machine for compound machining in all three axes X,Y,Z.

If the cellular core 14 were accurately uniform with precisely orthogonal rows and columns of cells, it could be conventionally fixtured for linear machining of each column of cells along straight X-axis tool paths.

However, FIG. 2 illustrates the substantial non-linearity of the cell centers 38 as represented by the exemplary center curve 42 for one column extending along the width dimension of the cellular core 14, perpendicular to the ribbon axis (L).

The operation of the scanner 44 shown in FIGS. 3 and 4 will similarly recognize the non-linearity of the locus of geometric centers 38 in a column of the so-scanned cells 30; and the correspondingly generated machining path E illustrated in FIGS. 4 and 6 should precisely match the non-linear center curves 42 of the FIG. 2 cell columns.

Since the primary objective of machining the hexagonal cellular core sheet 14 is to cut the narrow slots 46 at the top middle of the adjoining or bonded cell walls, the preferred machining path E is configured to travel through the self-recognized cell centers 38 for in turn cutting the cells to bifurcate the opposite adjoining walls thereof.

Accordingly, the laterally directed machining path E along the column axis (X) as generated after the scanning operation is preferably non-linear for the exemplary cellular core 14, and can vary substantially, such as varying longitudinally (Y) greater than about a half-width or half-size of the cells 30.

In the five adjacent columns of cells 30 discussed above with reference to FIG. 2, the maximum deviation D in linearity of the columns varied from 6.45 mm, 6.73 mm, 6.96 mm, 7.19 mm, and 6.93 mm, which deviation would similarly be recognized by operation of the scanner 44. In all five columns the center curves 42 similarly bow left over the middle region of the columns.

Since the longitudinal pitch spacing Sy of the cells 30 shown in FIG. 2, and therefore the nominal size thereof, is about 9.5 mm, straight (X) line cutting along a column of cells 30 starting at one center point 38 could vary substantially by about 6.45 mm to about 7.19 mm at the cells located near the maximum deviation portion of the curves 42.

Such large deviation in linearity of an individual cell column is substantially greater than the half-size or half-width of an individual cell 30, which means that if a straight cutting path parallel to the X-axis were used to machine the so-distorted core sheet 14 most wall cuts would be well off-center, and therefore the so-machined core would not meet design specifications.

However, by pre-scanning in situ the particular configuration of the cellular core workpiece 14 using the high-resolution scanner 44, any distortions or deviations in geometric configuration may be pre-identified or pre-recognized for use in custom tailoring the desired machining path E for accommodating those deviations.

In the exemplary Aramid honeycomb workpiece 14 illustrated in FIG. 6, the desired machining path E will preferably match the recognized deviation in non-linearity of each cell column being machined for accurately cutting the slots 46 along the cell centers to bifurcate the top of the adjoining cell walls. The corresponding slots 46 can therefore be machined along the wall middle or center from cell-to-cell irrespective of the non-linearity of the locus of cell centers since actual center locations are used in the machining path.

Since the exemplary workpiece core 14 comprises Aramid fiber in longitudinally extending ribbons with laterally adjoining cell walls defining a multitude of small hexagonal cells 30, additional features may be used to increase the speed of machining.

As shown in FIGS. 5 and 6, the desired configuration of the slot 46 is relatively small and narrow in a rectangular configuration with a depth A of about 3 mm and width B of about 1 mm. This small slot must be accurately machined in thin walls of the correspondingly small hexagonal cells of nominal 9.5 mm size.

In a typical CNC router, a single router bit spins at high speed for cutting a corresponding path in a workpiece. Testing has found that a single router bit (not shown) mounted in the spindle 24 fails to cut a suitably narrow slot 46, but instead simply slits the thin Aramid paper cell wall, which is unacceptable for the exemplary aircraft engine inlet application.

Furthermore, since the large workpiece sheet 14 has small hexagonal cells arranged in about 200 columns and 300 rows, the desired machining path E using a single cutter would require 200 corresponding passes (Y) along the X-axis to cut all cells therein.

Since many CNC routers include spindles which can accept various forms of cutters, one preferred form of the cutter 26 illustrated in FIG. 3 has a plurality, five for example, of circular saw blades suitably mounted for spinning in an otherwise conventional aggregate head assembly 48.

Aggregate head assemblies are commercially available for use in conventional CNC routers, and may include an additional axis of cutting movement, and various cutting tools, such as one or more circular saw blades. As shown in FIG. 3, the exemplary five saw blade cutters 26 are identical to each other and mounted vertically on a common drive shaft disposed substantially perpendicularly to the vertical (Z) axis of the supporting spindle 24 from which it is powered.

The aggregate head 48 may be suitably mounted for obtaining a fourth (C) axis of movement, which can rotate the vertical position of the cutter blades 26 over a 360 degree range. As shown in FIGS. 3 and 6, the aggregate head 48 is positioned around the C-axis with the diametrical planes of the five cutter blades 26 being oriented vertically atop the table 12, and generally parallel to the lateral X-axis.

In this way, operation of the cutter blades 26 spins the five blades for simultaneously machining five slots 46 in corresponding columns of cells 30. The aggregate head 48 is simply lowered with the spindle 24 in the Z-direction to engage the five cutters 26 with the top of the workpiece.

Testing has shown that the simple router bit was ineffective for cutting the desired slots 46 in the Aramid paper honeycomb core, whereas a circular saw blade was effective for creating a precisely defined narrow slot 46 meeting the depth and width specifications.

In alternate embodiments for different workpieces, for example a honeycomb core sheet made with aluminum cells, a conventional router bit might be acceptable where pre-scanning of the workpiece provides some benefit.

For the Aramid paper cellular workpiece, the blade cutters 26 can have suitable carbide teeth, for example, with a kerf width matching the desired width B of the slots 46, with the depth A of the slots 46 controlled by the vertical (Z) position of the blade cutters 26 as hanging from the supporting aggregate head 48 and spindle 24.

The diameter of the saw blades 26 may be suitably selected as a function of cell size and slot depth, and as shown in FIG. 6 should be small enough to limit blade engagement area in adjoining cells and the number of cells being cut simultaneously by a single blade.

Since the primary object of machining the cellular workpiece 14 is to preferentially and precisely machine the respective slots 46 in the multitude of individual cells 30 therein, the specific configuration of the cutter 26 and its cutting operation must complement the specific configuration and material of the cellular workpiece 14 to obtain the desired configuration and finish quality of the individual slots 46 being machined.

The exemplary thin-kerf carbide tipped circular saw blades 26 have been tested to provide acceptable finish quality in the machined slots 46 with suitably precise depth A and width B.

In the exemplary configuration shown in FIG. 6 the blade cutters 26 rotate counter-clockwise as the supporting head 48 translates right-to-left in the negative-X direction to effect climb cutting of the cellular workpiece 14 in which the carbide teeth of the cutter 26 engage the cells 30 with left-to-right motion in the positive-X direction, opposite to the negative-X motion of the translating supporting head 48.

This exemplary climb cutting of the cells 30 has been tested to achieve acceptable finish quality of the slots 46 in the Aramid-material cells 30.

Furthermore, climb cutting also directs downward the chip stream generated from cutting for more efficient chip and dust collection. And, particularly important in climb cutting is corresponding downward application of cutting forces from the blade cutters 26 atop the workpiece to better stabilize the workpiece in conjunction with the preferred vacuum clamping of that workpiece.

In alternate embodiments, the blade cutters 26 shown in FIG. 6 could instead rotate clockwise, instead of counter-clockwise, for effecting conventional cutting where the blade teeth would engage the cells in the same right-to-left motion of the supporting head 48 depending upon the specific configuration and material of the corresponding cellular workpiece.

Since the machining path E shown in FIG. 6 will typically be non-linear, that path may be configured to ensure that the diametrical plane of the saw blades 26 is substantially normal or perpendicular to the cells being cut both vertically and along that path.

In alternate embodiments, the rotary C-axis of the aggregate head 48 could be incorporated into the machining path (E=f(X,Y,C)) so that the saw blades 26 change rotary C-direction during machining as required or desired.

As shown in FIGS. 5 and 6, the aggregate head 48 preferably includes an odd number of the saw blades 26 spaced apart longitudinally for simultaneously and similarly slotting a corresponding plurality of adjoining cells 30.

Figure 7:
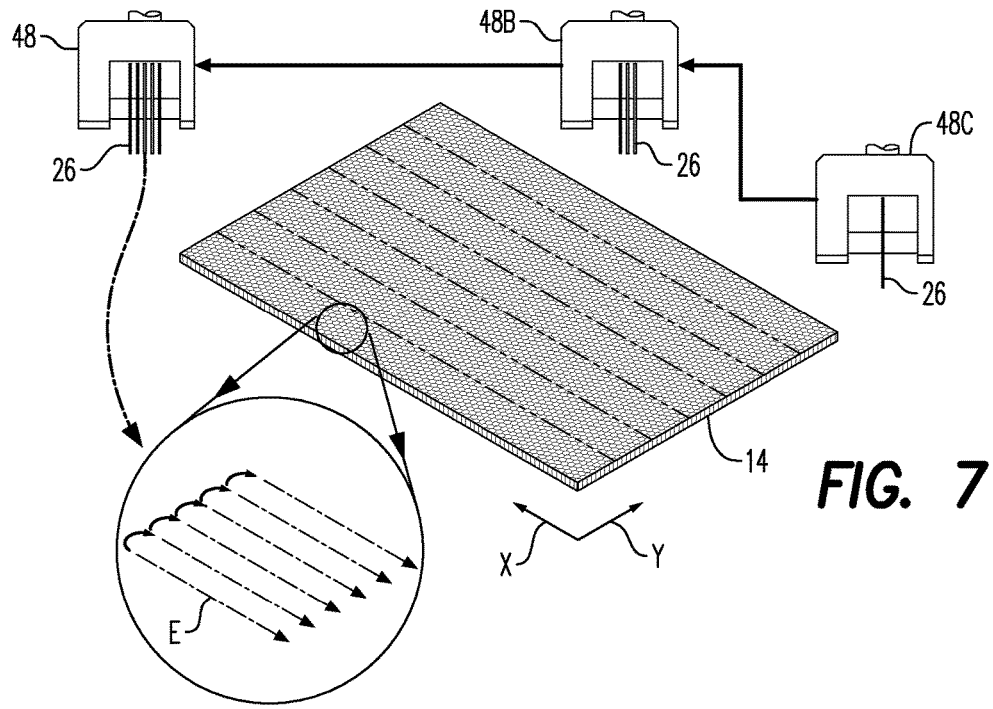
FIG. 7 is a flowchart showing machining of the core sheet shown in FIG. 5 in a sequence of machining passes using alternative cutter configurations.

FIGS. 3 and 7 illustrate a preferred embodiment of the aggregate head with five adjacent circular saw blade cutters 26 for simultaneously cutting or slotting five corresponding columns of cells 30.

FIG. 7 also illustrates alternate embodiments of the aggregate head 48B having three of the circular saw blade cutters 26 for simultaneously cutting or slotting three corresponding columns of cells 30; and another aggregate head 48C having a single circular saw blade cutter 26 for cutting or slotting a single column of cells 30.

In yet further embodiments (not shown), even numbers of circular saw blades could be used for correspondingly cutting or slotting corresponding numbers of cell columns.

In all embodiments of multiple saw blades, odd or even number, multiple cutters are desired for following a common or single machining path to simultaneously cut respective multiple columns of cells in order to decrease overall machining time.

However, multiple cutters driven simultaneously cannot therefore be independently driven, but must instead follow a common machining path as the common supporting spindle 24 is driven in the X-Y plane, and such common machining path is limited by the variations in cell geometry for particular workpieces.

As indicated above with respect to FIG. 2, laser measurement of an exemplary honeycomb core shows common distortion thereof when supported atop a table, which common distortion generally matches the center-deviation curve 42 illustrated, and which curve 42 is similar for the five adjacent columns test measured.

Accordingly, based on this tested observation of the exemplary cellular core sheet 14, the machining path E can be specifically generated for the middle one of the five blades 26, with the remaining four blades following the middle machining path parallel thereto.

Note for the five adjacent columns of cells 30 discussed above with reference to FIG. 2, the maximum deviation D in linearity of the columns varied from 6.45 mm, 6.73 mm, 6.96 mm, 7.19 mm, and 6.93 mm, all with a common bow configuration or profile generally parallel to each other. The middle column has a maximum deviation D of 6.96, which is only 0.26 mm different from the next left column; 0.51 mm different from the second left column; 0.23 mm different from the next right column; and 0.03 different from the second right column.

These small differences between the otherwise substantial non-linear locus 42 of cell centers supports the use of at least five adjacent saw blade cutters 26 following preferably a common, single machining path E generated specifically for the middle blade corresponding with the middle column of cells 30 being simultaneously machined.

Of course, the common machining path E could be generated from any one of the five adjacent columns corresponding to the five saw blade cutters 26 being used, or even suitably modified therefrom to maximize the accuracy of machining corresponding slots 46 in the corresponding columns of cells 30.

Notwithstanding the ability to simultaneously use multiple cutters 26, the large number of cell rows and columns in the core sheet 14 will most likely result in the machining path E having different profiles for different columns of the cells 30; and in the exemplary embodiment tested, the different machining profiles are similarly bowed as shown in FIGS. 2 and 6.

In the large cellular workpiece 14 shown in FIG. 7, over 200 cell columns extend over the Y-axis of the machine, in about 300 rows extending over the X-axis of the machine.

In one machining pass in the self-generated machining path E, the aggregate head 48 is translated generally along the X-axis from the top end of the workpiece 14 to the opposite bottom end (in the negative (−) X-direction); and is then repositioned at the top end to complete a second pass top-to-bottom, which repeats as necessary until all columns are suitably machined or slotted.

Using a five-blade cutter 26 can therefore reduce the total number of machining passes from about 200 for a single-blade cutter 26 to about forty passes. And, the machining process may be used to accurately slot all cell columns from edge-to-edge with minimal or no scrap or waste.

In this regard, the CNC machine 10 illustrated in FIG. 1 has a supporting table 12 in the preferred form of a conventional vacuum table operatively joined to a vacuum pump 50. The cellular core 14 is initially mounted atop the vacuum table, and because the exemplary core lacks any skin in this configuration, the hollow core cells 30 prevent vacuum holding or clamping.

Accordingly, a suitable thin rubber or elastomeric mat 52 is placed atop the core 14 to cover a major portion or surface area thereof and is air impermeable for allowing vacuum from the vacuum pump 50 to clamp downwardly the mat 52 atop the core for restraining or preventing lateral and longitudinal movement of the core during operation of the CNC machine 10.

A minor portion or surface area of the core 14 is not covered by the mat 52 to define a target zone in the core exposed for both scanning and machining thereof in sequence. Since the major portion is clamped down atop the table 12 by a vacuum force or pressure P as shown in FIGS. 1, 3, and 5, the major portion provides sufficient clamping of the minor portion along its adjoining side therewith to suitably restrain or prevent movement of even the exposed minor portion of the workpiece core 14.

As disclosed above with respect to FIGS. 3 and 4, the core 14 is suitably scanned by moving the scanner 44 along the X-axis over the exposed target zone generally corresponding with the field-of-view F of the scanner.

As shown in FIGS. 1 and 2, a plurality of the mats 52 are preferably placed atop the core 14 to collectively cover the major portion, with each mat 52 having a narrow width generally equal to the width of the exposed target zone and field-of-view F of the scanner 44.

The exemplary workpiece core 14 has about 200 columns along the Y-axis, which can be preferentially divided by seven so that six narrow mats 52 may be used to collectively cover the major portion, leaving the minor portion exposed and having about thirty cell columns exposed in the target zone.

As indicated above for FIG. 4, the target zone is first scanned by the scanner 44 to recognize the several columns of cells 30 therein to create corresponding machining paths E therefor. With those self-generated machining paths E, the machine 10 is then operated in FIGS. 5 and 6 to machine the desired slots 46 in the corresponding columns of cells 40 exposed within the target zone.

Since the target zone scan represents a narrow portion of the core length L, a plurality of machining paths E are generated from the first narrow scan to sequentially machine the cells 30 in multiple passes laterally along the column X-axis and longitudinally along the row Y-axis as shown in FIG. 7.

Figure 8:
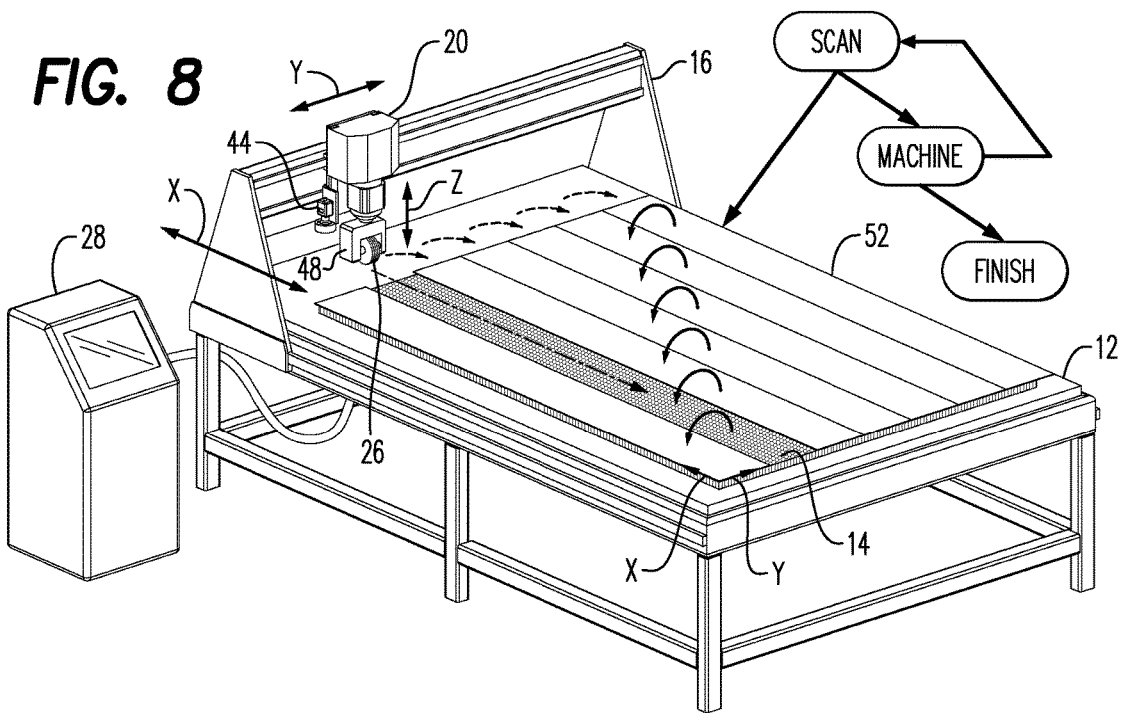
FIG. 8 is an isometric view of the machine shown in FIG. 1 showing multiple scanning and machining passes in corresponding target zones.

In FIG. 8, the target zone is indexed right to a second position by shuffling left successively an adjacent mat 52 to cover the preceding, or first, target zone, which therefore leaves exposed the second target zone between the first and third zone locations.

The scanning and machining processes are then repeated for the exposed second target zone in the same manner as conducted for the first target zone. In this configuration, the mats 52 now cover the first and third-seven target zone locations to securely clamp by vacuum the corresponding major portion of the core 14 now bridging the exposed second target zone.

This scanning and machining process is then repeated or indexed successively for the third, fourth, fifth, sixth, and seventh target zones until the workpiece core 14 is fully machined as intended from edge-to-edge over the full length L and width W thereof, with little or no scrap or waste around the perimeter.

Any variations in geometry of the individual cells 30 in each of the seven target zones is recognized by the corresponding scans thereof and automatically accommodated in the respective machining paths E specifically configured therefor.

Scanning of the core geometry self-recognizes the actual in situ configuration of the workpiece core 14 and its individual cells 30 mounted atop the vacuum table 12. The so recognized core geometry is then automatically introduced in the desired machining path E for accurately cutting the slots 46 to bifurcate the adjoining cell walls in a self-regulating operation of the CNC machine 10.

Operator assistance is reduced to simply indexing the several mats 52 between machining of the indexed target zones, with scanning and machining of each target zone being otherwise automatic and self-regulated by the CNC machine 10 itself as specifically configured and programmed therefor.

In alternate embodiments of different workpieces, the clamping mats 52 may not be necessary provided such workpieces can be securely fixtured by the vacuum table or by other means. In such case, operator assistance can be further reduced to initial setup of the workpiece atop the table 12, with scanning and machining thereof being suitably programmed for substantially automatic operation based on predetermined geometry of the workpiece and required machining thereof.

As indicated above, the basic CNC machine 10 can be suitably modified from various commercially available machines to incorporate a suitable scanner 44 and suitably configure the computer 34 for conducting self-recognition of the in situ geometrical configuration of the desired workpiece, and then self-generating a corresponding machining path E specifically configured for the corresponding workpiece.

For example, a Model 43 CNC 3-Axis Machining Center having an integral vacuum table is commercially available from Thermwood.com, having a place of business in Dale, Ind.

Another example is the 3-Axis D3 Machine also having an integral vacuum table, and commercially available from Diversified Machine Systems of Colorado Springs, Colo.

Both these machines may be modified to include a suitable scanner; and further configured in software to provide self-recognition of cell configuration and self-regulation of the predetermined machining paths E desired and corresponding to the intended workpiece.

The self-recognition CNC machining described above enjoys many advantages in preferentially machining the exemplary honeycomb core sheet. The optical recognition (vision system) accurately recognizes and transmits the geometric center of individual core cells to the machine controller using suitable software.

Software self-creates the numerical control (NC) programs for the machine controller to execute as cut paths for machining operation.

The numerical control (NC) program is executed by the machine controller for the slot cutting operation.

Vacuum is used to stabilize the core during slotting operation with no damage to core sheet.

The aggregate head assembly can be used to cut one (1) to five (5) machine paths simultaneously.

Self-recognition scanner capability allows slot machining on a variety of core types and sizes.

Optical recognition allows the core material to be placed without precise location and mechanical alignment. This eliminates long setups. Elimination of continuous mechanical alignment allows the machining operation to be conducted at faster speeds up to the limitations of blade tip speeds and material restrictions, estimated at 40 minutes or less per sheet.

The machine system will allow an operator to load the machine and press cycle start. The machine will then acquire its data and execute the machining process without operator intervention. This will allow the operator to perform other tasks while the process is occurring.

The process of data acquisition will compute the core cell center regardless of shape and size.

The machine controller will execute the numerical control (NC) program cut paths generated by the software utilizing the carriage assembly with the only contact with the core sheet being the mounted aggregate head assembly precision saw blade(s).

Vacuum core stabilization eliminates the need for manual clamping and resulting scrap of the material periphery.

The machining process is simplified, with the machine operator initially placing a sheet of core on the router vacuum table. The operator lays strips of suitable mat material on the sheet of core excluding the target zone and activates the router table vacuum system. The operator then activates the machine controller software program to start the data acquisition process.

The carriage head assembly with mounted camera system then automatically acquires a series of scan images along the target zone and transmits them back to the software system in the machine controller.

The software system analyzes the core cell centers, creates cut paths, generates the numerical control (NC) program, and sends the numerical control (NC) program to the machine controller as an executable file.

The machine controller executes the numerical control (NC) program guiding the carriage assembly with aggregate head assembly along the generated cut paths in the target zone.

The operator stops the cycle and deactivates the router table vacuum system; and removes the mat material strip from the next target zone and places it on the previous target zone.

The operator again activates the router table vacuum system; and restarts the cycle and the process repeats for the new target zone.

The mat strip is indexed to the next target zone, and the process steps are repeated until the entire sheet of core has been slotted.

By incorporating a measurement scanner in the otherwise conventional CNC machine, and preferentially programming the computer to operate that scanner to recognize and identify cell geometry in situ, the so-scanned cell geometry may then be automatically entered into the desired machining path to precisely machine the cellular workpiece irrespective of size, configuration, and geometrical variations thereof when mounted atop the machining table.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of machining a cellular core (14) having individual cells (30) arranged laterally in a plurality of columns and longitudinally in a plurality of rows, comprising:
   mounting said core (14) atop a table (12) in a multi-axis Computerized Numerical Controlled (CNC) machine (10);
   scanning said core (14) atop said table (12) to recognize said individual cells (30) arranged laterally in columns and longitudinally in rows and additionally recognize any non-linearity in a column of said scanned cells (30) when mounted atop said table (12);
   generating a machining path (E) from said recognized cells (30) and matching said non-linearity in said column of scanned cells (30); and
   machining said core (14) along said generated machining path (E) to machine corresponding cells (30) sequentially in turn along said scanned column in said core (14).

2. A method according to claim 1 wherein said CNC machine (10) further comprises:
   an elevated gantry (16) extending longitudinally across said table (12), and mounted thereto by a lateral drive system (22);
   a carriage (20) mounted to said gantry (16) by a longitudinal drive system (18);
   a cutter (26) mounted to said carriage (20) for travel therewith, and being vertically deployable for machining said core (14) along said generated machining path (E);
   a scanner (44) mounted to said carriage (20) for travel therewith for scanning said core (14) to recognize said cells (30); and
   wherein said scanner (44) is operated first to scan said core (14) to generate said machining path (E), and said cutter (26) is operated in turn to machine said cells (30) along said generated machining path (E).

3. A method according to claim 2 wherein said CNC machine (10) further comprises:
   a computer (34) operatively joined to said scanner (44) for scanning said core (14);
   a CNC controller (36) operatively joined to said lateral and longitudinal drive systems (22,18) for controlling travel of said cutter (26) along said machining path (E); and
   said computer (34) is configured to generate said machining path (E) from said cells (30) recognized by said scanner (38).

4. A method according to claim 3 wherein:
   said core (14) is scanned to recognize corresponding geometric centers (38) of said cells (30); and
   said machining path (E) is generated laterally along said cell centers (38) in a corresponding column of said cells (30).

5. A method according to claim 4 wherein said lateral machining path (E) is non-linear and varies longitudinally greater than a half-width of said cells (30).

6. A method according to claim 4 wherein:
   said core cells (30) are hexagonal in configuration and distributed generally uniformly both laterally and longitudinally; and
   said machining path (E) is configured for cutting said cells (30) to bifurcate opposite walls thereof.

7. A method according to claim 4 wherein:
   said core (14) comprises Aramid fiber in longitudinally extending ribbons with laterally adjoining cell walls defining hexagonal cells (30);
   said cutter (26) comprises an aggregate head (48) mounted to a spindle (24) in said carriage (20), with said head (48) having a circular saw blade cutter (26) extending vertically atop said table (12); and
   said machining path (E) is configured to cut a slot (46) atop said adjoining cell walls along a column of said cells (30).

8. A method according to claim 7 wherein:
   said aggregate head (48) includes an odd number of saw blade cutters (26) spaced apart longitudinally for simultaneously and similarly slotting a corresponding plurality of adjoining cells (30); and
   said machining path (E) is specifically generated for the middle one of said blade cutters (26), with the remaining blade cutters (26) following said middle machining path (E) parallel thereto.

9. A method according to claim 3 wherein said machining path (E) has a different profile for different columns of said cells (30).

10. A method according to claim 9 wherein said different machining profiles are similarly bowed.

11. A method according to claim 9 further comprising a plurality of said cutters (26) operated simultaneously to simultaneously cut a respective plurality of columns of said cells (30).

12. A method according to claim 11 wherein said plurality of cutters (26) simultaneously follow a single machining path (E) for simultaneously cutting a respective plurality of cell columns.

13. A method according to claim 12 wherein said single machining path (E) is configured for a middle column of said cells (30) being simultaneously machined.

14. A method according to claim 3 wherein:
   said core (14) is initially mounted atop a vacuum table (12) operatively joined to a vacuum pump 50);
   a mat (52) is placed atop said core (14) to cover a major portion thereof for allowing vacuum from said vacuum pump (50) to clamp downwardly said mat (52) atop said core (14) for restraining lateral and longitudinal movement of said core (14) during operation of said CNC machine (10); and
   a minor portion of said core (14) is not covered by said mat (52) to define a target zone in said core (14) exposed for both scanning and machining thereof in sequence.

15. A method according to claim 14 wherein:
a plurality of said mats (52) are placed atop said core (14) to collectively cover said major portion, with each mat (52) having a width generally equal to the width of said exposed target zone;
said target zone is indexed by shuffling successively an adjacent mat (52) to cover a preceding target zone; and
said core (14) is scanned and machined successively along said indexed target zones.

16. A method according to claim 3 wherein:
said core (14) is scanned in a narrow field-of-view; and
a plurality of machining paths (E) are generated from said narrow scan to sequentially machine said cells (30) in multiple passes laterally and longitudinally.

17. A method according to claim 3 wherein:
said scanner (44) comprises a digital camera operatively joined to said computer (34), and having sufficient resolution for optically recognizing individual cells (30) in said core (14);
said computer (34) is configured to identify corresponding geometric center points (38) of said optically recognized cells (30), and join together said center points (38) in a machining path (E) for a corresponding column of said cells (30); and
said machining path (E) generated in said computer (34) is configured for use in said CNC controller (36) to effect machining of said core (14) by said cutter (26).

18. A method according to claim 3 wherein:
said core cells (30) are hexagonal in configuration and distributed generally uniformly both laterally and longitudinally;
said core (14) is scanned to recognize corresponding geometric centers (38) of said cells (30); and
said machining path (E) is generated laterally along said cell centers (38) in a corresponding column of said cells (30), and configured for cutting said cells (30) to bifurcate opposite walls thereof.

19. A method according to claim 18 wherein:
said core (14) comprises Aramid fiber in longitudinally extending ribbons with laterally adjoining cell walls defining said hexagonal cells (30);
said cutter (26) comprises an aggregate head (48) mounted to a spindle (24) in said carriage (20), with said head (48) having a circular saw blade cutter (26) extending vertically atop said table (12); and
said machining path (E) is configured to cut a slot (46) atop said adjoining cell walls along a column of said hexagonal cells (30).

20. A Computerized Numerical Controlled (CNC) machine (10) for machining a cellular core (14) having individual cells (30) arranged laterally in a plurality of columns and longitudinally in a plurality of rows, comprising:
an elevated gantry (16) extending longitudinally across a table (12) for supporting said core (14), and mounted to said table (12) by a lateral drive system (22);
a carriage (20) mounted to said gantry (16) by a longitudinal drive system (18);
a cutter (26) mounted to said carriage (20) for travel therewith, and being vertically deployable for machining said core (14) atop said table (12) and along a machining path (E);
a CNC controller (36) operatively joined to said lateral and longitudinal drive systems (22,18) for controlling travel of said cutter (26) along said machining path (E);
a scanner (44) mounted to said carriage (20) for travel therewith for scanning said core (14) to recognize said individual cells (30) thereof arranged laterally in columns and longitudinally in rows;
a computer (34) operatively joined to said scanner (44) and configured to scan said core (14) to recognize said cells (30) and any non-linearity in a column of said scanned cells (30) when said core (14) is mounted atop said table; and self-generate said machining path (E) from said cells (30) self-recognized by said scanner (44), with said machining path (E) matching said non-linearity in said column of scanned cells (30); and
wherein said computer (34) is further configured to operate said scanner (38) first to scan said core (14) and pre-generate said machining path (E), and then operate said cutter (26) second in turn through said CNC controller (36) to machine said cells (30) along said self-generated machining path (E) sequentially in turn along said scanned column in said core (14).

* * * * *